(12) United States Patent
Bordier (10) Patent No.: US 11,935,141 B2
(45) Date of Patent: Mar. 19, 2024

(54) DECISION ASSISTING ARTIFICIAL INTELLIGENCE SYSTEM FOR VOTER ELECTORAL AND LEGISLATIVE CONSENSUS BUILDING

(71) Applicant: Nancy Bordier, Washington, DC (US)

(72) Inventor: Nancy Bordier, Washington, DC (US)

( * ) Notice: Subject to any disclaimer, the term of this patent is extended or adjusted under 35 U.S.C. 154(b) by 0 days.

(21) Appl. No.: 17/461,872

(22) Filed: Aug. 30, 2021

(65) Prior Publication Data

US 2022/0067844 A1 Mar. 3, 2022

Related U.S. Application Data

(60) Provisional application No. 63/072,234, filed on Aug. 31, 2020.

(51) Int. Cl.
| | | |
|---|---|---|
| *G06Q 50/00* | (2012.01) | |
| *G06F 16/9536* | (2019.01) | |
| *G06N 20/00* | (2019.01) | |
| *G07C 13/00* | (2006.01) | |
| *H04L 9/40* | (2022.01) | |

(52) U.S. Cl.
CPC ......... *G06Q 50/01* (2013.01); *G06F 16/9536* (2019.01); *G06N 20/00* (2019.01); *G07C 13/00* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 7,953,628 B2 | 5/2011 | Bordier | |
| 10,657,205 B2 | 5/2020 | Ferrucci et al. | |
| 2008/0048032 A1* | 2/2008 | Bordier | G06Q 30/0201 235/386 |
| 2015/0332423 A1* | 11/2015 | Hager | G06F 16/2282 705/12 |
| 2018/0114392 A1* | 4/2018 | Mejia | G07C 13/00 |
| 2021/0174625 A1* | 6/2021 | Pinkerton | G06F 16/27 |
| 2021/0352075 A1* | 11/2021 | Thirumalai | G06Q 50/01 |
| 2022/0027416 A1* | 1/2022 | Van Dusen | G06F 16/90335 |

* cited by examiner

*Primary Examiner* — Scott A Zare

(57) ABSTRACT

A computer-implemented system and methods for electoral and legislative consensus building via a social network provide decision support to assist network users define their legislative priorities and set common legislative agendas. Users include individuals intending to vote ("voters"), lawmakers, electoral candidates, political parties, and others. Decision-assisting Artificial Intelligence, machine learning technology, a corpus of data in the domain of elections and legislation, and database of user stories, generate legislative priorities for user fact-checking, evaluating, debating, and voting to include in common agendas. The network connects voters within and across election districts and national boundaries to build consensus around legislative agendas with cross national scope. The network assists voters form online voting blocs, political parties, and electoral coalitions to elect lawmakers to enact their agendas, by attracting electoral support from voters across partisan lines. Users can provide legislative mandates to lawmakers by conducting petition drives, referendums, initiatives, and informal recall votes.

10 Claims, 2 Drawing Sheets

Schematic Overview

Electoral and Legislative Consensus Building Computer System

Fig. 1
Schematic Overview

Electoral and Legislative Consensus Building Computer System

FIG. 2
Methods for Defining Legislative Agendas

DECISION ASSISTING ARTIFICIAL INTELLIGENCE SYSTEM FOR VOTER ELECTORAL AND LEGISLATIVE CONSENSUS BUILDING

BACKGROUND OF THE INVENTION

(1) Field of the Invention

The disclosed computer-implemented system and methods for electoral and legislative consensus building via a social network are related to the following fields:

G06Q Data Processing Systems or Methods

The disclosure creates databases for processing digital information contained in a corpus of data in the domain of elections and legislation, and in information generated by users for defining their legislative priorities, and for periodically updating and storing, retrieving, and sharing their priorities in the system's databases, including a database of legislative priorities.

G06Q 2230/00 Voting or election arrangements.

Users can access the network to define their legislative priorities, connect to users with similar priorities, and set common legislative agendas by using the system's voting utility to vote on priorities to include in their agendas.

G06N 5/00 Computer systems using knowledge bases or creating knowledge bases.

The system's corpus of data in the domain of elections and legislation includes repositories of laws, legislative proposals and deliberations; users' interactions, consensus building stories, and votes using the system's voting utility; policy and program evaluations; and information from social media, newspapers and journals. Users can access and add to the system's corpus of data in the domain of elections and legislation, and create and manage their own private databases.

G06N 20/00 Machine learning. Methods or apparatus giving a machine (in its broadest sense) the ability of adapting or evolving according to experience gained by the machine. A machine in its broadest sense is understood as either an "abstract machine" or a physical one (i.e. a computer).

The disclosure comprises machine learning technology with a corpus of data in the domain of elections and legislation, which voters, lawmakers, electoral candidates, political parties, and others can query in natural language to obtain answers containing lists with a plurality of possible legislative priorities that they can evaluate, debate, reformulate, and vote on, for inclusion in common legislative agendas.

G06Q 50/01 {Social network} Subject matter drawn to a computerised arrangement for the management of interaction between individuals or entities who are connected by one or more common relations or interests.

The disclosure's social network connects users with similar needs, interests, and legislative priorities, and provides them decision support for defining their legislative priorities and setting common legislative agendas.

G06Q 10/101 {Collaborative creation of products or services} Subject matter drawn to a computerised arrangement for initial conceptual development, through cooperation between plural parties, e.g. brainstorming, idea development, of a commodity or of work that can be performed for another.

The disclosure enables voters and others users to collaborate in generating, identifying, debating, formulating, and voting on electoral and legislative priorities and agendas.

G06Q 50/182 {Alternative dispute resolution} Subject matter drawn to a computerised arrangement for the development or maintenance of procedures or processes, e.g. arbitration, re conciliation, mediation, that are voluntarily adopted to resolve controversies (or to settle disagreements) before taking recourse to legal action, i.e. litigation.

The disclosed social network enables users to create self-selecting aggregates of users to collectively fact-check, evaluate, debate, and reconcile divergent views, legislative priorities, and legislative agendas to resolve and prevent legislative conflicts and stalemates in decision-making bodies.

(2) Description of the Related Art

Democratic representative forms of government typically confer popular sovereignty to the citizens of a nation, by empowering them to elect lawmakers to governmental legislative, executive, and judicial bodies to enact and interpret laws protecting and promoting citizens' well-being.

Implementation of this goal has been impeded in the $21^{st}$ century by obstacles that prevent voters from determining who runs for office, who wins elections, and what laws are passed. (Hill, Steven. 2002. "Fixing Elections." *Routledge & CRC Press.* https://www.routledge.com/Fixing-Elections-The-Failure-of-Americas-Winner-Take-All-Politics/Hill/p/book/9780415931946.)

As a result of these impediments, elected representatives who control legislative bodies often represent a minority of voters and tend to enact laws that fail to protect the well-being of the majority. Their legislative actions can exacerbate inequities in wealth and income. (Markovits, Daniel, and Ian Ayres. 2018. "Opinion|The U.S. Is in a State of Perpetual Minority Rule." *Washington Post.* https://www.washingtonpost.com/opinions/the-us-is-in-a-state-of-perpetual-minority-rule/2018/11/08/9f9f38a0-e2b1-11e8-8f5f-a55347f48762_story.html.)

Contemporary analysts and researchers have found that these "democratic deficits" impede realization of the primary goal of popular sovereignty, which is to empower "control of government by its citizens". The result is a widespread loss of trust in elected officials and the fairness of the laws they enact. (Pew Research. "Key Findings about Americans' Declining Trust in Government and Each Other." https://www.pewresearch.org/fact-tank/2019/07/22/key-findings-about-americans-declining-trust-in-government-and-each-other/.)

To remedy these deficits, the most urgent task today is to "mend the breach of distrust between the institutions of self-government and the public", according to one prominent analyst. (Gardels, N. 2020 "Mending the Rupture Between Institutions of Self-Government and the Public". https://www.berggruen.org/ideas/articles/mending-the-rupture-between-institutions-of-self-government-and-the-public/).

Remedies must surmount numerous impediments to citizens' effective exercise of their popular sovereignty. Key among them is the lack of effective consensus building and agenda setting mechanisms. Partisan conflicts proliferate during electoral and legislative cycles and often remain unresolved, causing legislative stalemates and paralysis due to the lack of these vital mechanisms.

To circumvent, resolve, and supplant partisan conflicts, a social network incorporating Artificial Intelligence-based machine learning technology and consensus building mechanisms can empower network users worldwide to strengthen self-government in their countries by:
- Defining, updating, and sharing their legislative priorities.
- Connecting to each other to build consensus across partisan lines to set common legislative agendas.
- Forming online voting blocs, political parties, and electoral coalitions around cross partisan legislative agendas, hosted on the network.
- Planning and conducting campaigns to elect lawmakers of their choice to enact their agendas.

The social network and its consensus building capabilities provide unprecedented mechanisms that enable mainstream users to reach out across partisan lines to build consensus with voters espousing diverse legislative priorities. Such outreach enables them to reconcile divergent priorities across partisan lines, and create electoral bases large enough to elect candidates of their choice to legislative bodies to enact their legislative agendas. The network provides them political organizing tools they can use to build blocs, parties, and coalitions, which can lead to the election of lawmakers who represent a majority of the electorate and the population as a whole.

Decades of academic research show that mainstream U.S. voters tend to hold "centrist" legislative priorities, and prefer compromise to resolve divergent views and priorities—especially to prevent legislative stalemates that prevent the passage of needed legislation. However, mainstream voters' exercise of their popular sovereignty is weakened when partisan electoral candidates and lawmakers are elected to legislative bodies who do not represent a majority of mainstream voters, but instead enact legislation demanded by political partisans who represent a minority of eligible voters and the population at large.

An additional factor that can undermine voters' effective exercise of their popular sovereignty is the use of social media by partisan interests to disseminate misinformation to undiscerning, easily persuadable segments of the electorate. These segments can cast enough votes to sway primary elections, often due to large donations of campaign funds from sources outside the election district that determine which candidates have the financial wherewithal to run and win primary and general elections. Institutional and financial obstacles to "free and fair" elections reduce the representativeness of lawmaking bodies. Resulting discrepancies between the priorities of mainstream voters and the priorities of elected representatives weaken the effective exercise of voters' popular sovereignty.

In contrast, the issue stances and legislative priorities of mainstream voters tend towards "the center" of the political spectrum. Their "centrist" views have been found to diverge from those of partisan electoral candidates, incumbent lawmakers, political party activists, and donors, whose priorities tend towards the "right" and "left" of the political spectrum. While the views of activists on both ends of this spectrum are more likely to be polarized, those of mainstream voters are not, a discrepancy that dates back to the 1970s. (Maisel, L. Sandy. 2007. *American Political Parties and Elections: A Very Short Introduction*. Oxford University Press; Fiorina, Morris (2017). "Political Parties More Polarized than Voters." *Stanford News*. https://news.stanford.edu/2017/12/20/political-parties-polarized-voters/.)

These long-standing discrepancies in legislative priorities between mainstream voters, on the one hand, and political parties, party activists, and party-affiliated lawmakers, on the other hand, are reflected in voters' reported perceptions that elected representatives do not represent them.

The Pew Center reported in 2014 that despite the increasingly polarized wings of the two major political parties, the majority remains in the center. (Pew Research Center. 2014. *The Political Typology: Beyond Red vs. Blue*. https://www.pewresearch.org/politics/2014/06/26/the-political-typology-beyond-red-vs-blue/)

Immediately following the 2018 U.S. mid-term elections, half of registered voters expressed the view that the newly elected Congress did not represent their views, including Democrats, Independents and Republicans. (Edwards-Levy, Ariel. 2018. "Most Americans Don't Feel Well-Represented By Congress." *HuffPost*. (https://www.huffpost.com/entry/congress-americansrepresentation_n_5c10244fe4b00e17a533c813.)

The views of voters surveyed in 2018 are similar to those of mainstream U.S. voters collected for several decades. Research conducted by the Pew Research Center between 1987 and 2007 showed that Americans have felt increasingly estranged from government and others, and do not think their elected representatives care what they think. These feelings exist among voters belonging to the two main U.S. political parties, as well as voters registered as independents. (Pew Research Center. 2007. *U.S. Politics and Policy. Trends in Political Values and Core Attitudes:* 1987-2007. https://www.pewresearch.org/politics/2007/03/22/trends-in-political-values-and-core-attitudes-1987-2007/.)

A social network dedicated to cross partisan consensus building can reduce these discrepancies by counteracting several additional factors that exacerbate the priorities gap between voters and lawmakers, and weaken the effective exercise of popular sovereignty in elections and legislation.

One factor is that voters, lawmakers, electoral candidates, and political parties lack mechanisms by which they can define and share their legislative priorities across the board.

An additional related factor is the lack of effective consensus building mechanisms for reconciling divergent priorities.

When voters, electoral candidates, lawmakers, and political parties lack effective legislative agenda setting and consensus building mechanisms, they are prevented from devising and negotiating mutually acceptable legislative agendas that can lead to the enactment of public policies that protect and promote the well-being of voters, specific constituencies, and the population as a whole.

Voters are impeded in fully exercising their popular sovereignty when
- The full range of their legislative priorities cannot be explicitly defined, updated, shared, and publicized.
- The legislative priorities held by candidates, lawmakers and electoral candidates are unspecified and unknown.
- Effective mechanisms for reconciling conflicting and divergent legislative priorities across partisan lines are lacking.

The proposed social network dedicated to electoral and legislative consensus building can surmount these impediments obstructing the effective implementation of democratic forms of representative government and citizens' effective exercise of popular sovereignty. The network's decision-assisting Artificial Intelligence and question-answering machine learning technology can enable highly scalable numbers of voters, lawmakers, electoral candidates, political parties and others, operating within and across election district and national boundaries, to engage in cross partisan consensus building and legislative agenda setting.

These technologies enable large numbers of voters, lawmakers, electoral candidates, political parties, and other interests (such as civil society groups) to connect online and collaborate to collectively devise mutually acceptable legislative solutions to problems, crises, and emergencies that cross election district and national boundaries, such as climate catastrophes and pandemics that require cross-national cooperation. They can overcome legislative stalemates and paralysis by building domestic and cross national consensus to implement collaboratively determined common legislative solutions to common challenges.

One of the social network's key enabling technologies is machine learning technology, due to its capacity to process, store, and retrieve voluminous amounts of information to provide querying users increasingly useful answers to successive rounds of questions posed in natural language. The massive data processing capabilities of machine learning technology can provide users a broader range of legislative priorities than they might otherwise consider, and facilitate evaluation of a broader range of alternatives by voters, lawmakers, electoral candidates, political parties, and others who request such information.

They can use the capabilities of this machine learning technology to fact-check information and eliminate misinformation and falsehoods disseminated by political partisans via social media, which can exacerbate the impact of partisan conflicts among political parties, electoral candidates, and lawmakers. Together, they can fuel the confusion generated by inter-party conflicts and persuade undiscerning voters to espouse priorities that can jeopardize their well-being. (Taub, Amanda. 2017. "Why Americans Vote 'Against Their Interest': Partisanship." *The New York Times*. https://www.nytimes.com/2017/04/12/upshot/why-americans-vote-against-their-interest-partisanship.html.)

The disclosed social network provides voters an autonomous online platform where they can freely define their legislate priorities without pre-established partisan constraints, in concert with their mainstream friends, family, neighbors, co-workers, and voters across the spectrum who are open to compromise. They can dialogue, debate, formulate, and vote on common legislative agendas comprising priorities that cross partisan lines, using the network's voting utility.

Research has found that individuals who interact with other people and groups that hold a diversity of views and preferences are more likely to be able to build consensus among themselves than people belonging to isolated groups that lack a diversity of viewpoints. (Stern, Kenneth. 2017. "Understanding Your Political Opponents Takes More than a Visit to Their Neck of the Woods." *National Review*. https://www.nationalreview.com/2017/11/ken-stern-republican-like-me-entertaining-sociological-tourism-failed-bipartisan-appeal/; Sunstein, Cass. 2011. *Going to Extremes: How Like Minds Unite and Divide*. Oxford University Press.) Such groups include social media-biased enclaves of people tending to espouse more uncompromising views than less isolated individuals and groups.

The agenda setting capabilities provided by the proposed social network's decision-assisting Artificial Intelligence (AI) and machine learning technology make this vital, highly scalable consensus building technologically feasible. Amicably negotiated resolution of political, electoral, and legislative conflicts has become indispensable in the 21$^{st}$ century to ensuring democratic forms of government and the effective exercise of popular sovereignty.

The proposed social network's consensus building, agenda setting and political organizing mechanisms enable voters worldwide to form voting blocs, political parties, and electoral coalitions hosted on the network; collaboratively build consensus around common legislative agendas; and collaboratively plan and conduct campaigns to elect lawmakers of their choice to enact their agendas. These mechanisms empower them to resolve as well as prevent legislative stalemates that impede lawmakers from enacting legislation that meets the needs and priorities of voters at large, specific constituencies, and the population at large.

A key contribution to digitally-enabled consensus building stems from the recent technological evolution of decision-assisting Artificial Intelligence (AI) that amplifies human intelligence, rather than replaces human intelligence, by assisting real people make decisions. This evolved AI technology is reflected in IBM's path-breaking Project Debater. Its machine learning technology assists people in making well-informed decisions by "debating" with its AI-based argumentation tool, which uses natural language to "argue" on behalf of fact-checked arguments against non-fact-based arguments. It absorbs massive, diverse sets of information, and is the "first AI system that can debate humans on complex topics." (IBM Project Debater (2019) *IBM Research AI*. https://www.research.ibm.com/artificial-intelligence/project-debater//.)

The technological feasibility of developing large scale question-answering systems and databases was publicly demonstrated in 2011 by IBM's Watson Technology. One of the first iterations of this novel technology won the quiz game of Jeopardy in 2011. (Watson Computer. https://en.wikipedia.org/wiki/Watson_(computer))

It is described as a question-answering computer system capable of answering questions posed in natural language, and "learning" during successive rounds of Q&A to provide increasingly useful answers as the result of interactions with humans posing questions.

Subsequent technological developments that facilitate human-computer interaction include those designed by engineers and developers at the firm Elemental Cognition, LLC, founded by engineer David Ferrucci, the leader of the team that invented IBM's Jeopardy-winning Watson technology. One of the Elemental Cognition team's primary goals is to transform computers into "thought partners" that can interact with question-posing humans and learn from their interactions how to understand and explain the "why" behind their answers.

A recent patent awarded Ferrucci's company illustrates this new technological ground that Ferrucci's team is charting to create interactive human-computer "thought partnerships". (Ferrucci, David, et. al. (2020) Architecture and Processes for Computer Learning and Understanding. U.S. Pat. No. 10,657,205. Issue Date: May 19, 2020.)

It comprises an interactive story model "of semantic and frame structures" that enables an AI-based computer to infer an "understanding" of the information. The computer's understanding is "tested through computer generated questions that are posed to humans through interactive dialog sessions." As questions from humans are received, the answers received from the computer's story model are refined, allowing the system "to grow in knowledge and thereby understand stories of increasingly higher reading comprehension levels."

These technological breakthroughs in human-computer interaction enhance the potential of the disclosed system and social network to assist voters worldwide effectively exercise their popular sovereignty by generating and evaluating a broader range of alternatives in order to make better informed decisions. Information generated by authorized consensus building users of the proposed social network can be mined to compose and share stories showing how users define their legislative priorities; build consensus to set common legislative agendas; form online voting blocs, political parties, and electoral coalitions around common legislative agendas; and plan and conduct campaigns to elect lawmakers of their choice to enact users' legislative agendas.

Despite the wide-ranging knowledge bases and multifaceted expertise possessed by millions of 21$^{st}$ century voters worldwide, most voters lack opportunities to fully inject their knowledge and know-how into electoral and legislative processes. The technological advances exemplified by the architecture and processes for computer learning and understanding emerging from Ferrucci's team at Elemental Cognition, LLC have the potential to enable users of the proposed social network dedicated to electoral and legislative consensus building to interact with the network's machine learning technology to hone, expand and inject their knowledge and know-how into vital decision-making processes occurring in typical electoral and legislative processes.

The composition of generic and idiosyncratic stories of users efforts to build consensus across partisan lines, and the sharing of the stories with network users worldwide, can enhance their existing critical thinking skills, and enrich the dialogues taking place when voters define their electoral and legislative priorities, and cast their ballots to make crucial electoral and legislative decisions to implement their agendas. Access to such voter-based stories can dramatically increase voters' consensus-building capabilities while incrementally increasing the capabilities of the network's machine learning technology to provide them an unprecedented range of legislative options and solutions that they can fact check and use to resolve common problems, crises, emergencies, and conflicts requiring legislative action.

With decision-support from decision assisting Artificial Intelligence and question-answering machine learning technology, voters worldwide can connect to each other to collaboratively devise common legislative solutions to common challenges, such as global pandemics and climate disruption. They can register to vote in election jurisdictions where they are entitled to vote, and cast votes for candidates of their choice to enact legislative agendas similar to the common agendas collaboratively devised by their cross jurisdictional, local, regional, and national "parent" voting blocs, political parties, and electoral coalitions, within and across national boundaries.

Users can use the network's decision-assisting mechanisms to collaboratively formulate and provide legislative mandates to lawmakers by conducting petition drives, referendums, initiatives, and informal recall votes.

BRIEF SUMMARY OF THE INVENTION

The goal of the invention is to supplant the partisan conflicts that often cause stalemates and paralysis in governmental decision-making bodies, by creating a unique social network dedicated to electoral and legislative consensus building across partisan lines. The invention provides decision support to assist network users define their legislative priorities and build consensus across partisan lines to set common legislative agendas. Users include individuals intending to vote ("voters"), lawmakers, electoral candidates, political parties, and others, such as civil society organizations and NGOs.

Electoral and legislative processes and institutions in democratic forms of government tend to generate partisan conflicts. These conflict often remain unresolved by lawmakers in legislative and executive branches of government, largely due to the lack of cross partisan electoral and legislative consensus building mechanisms.

The invention's social network, which combines AI-based machine learning technology with the network's agenda setting, consensus building, and political organizing mechanisms, provides decision support assisting network users to:
Define and share their legislative priorities;
Build consensus across partisan lines to set common legislative agendas;
Form online voting blocs, political parties, and electoral coalitions hosted on the network;
Plan and conduct campaigns to elect lawmakers of their choice to enact the agendas of their blocs, parties, and coalitions They will be able to reach out to voters with diverse legislative priorities to build cross partisan consensus and thereby create electoral bases large enough to elect candidates of their choice to legislative bodies to enact their legislative agendas.

Research has shown that mainstream U.S. voters, for example, tend to favor compromising across partisan lines with other voters and lawmakers to prevent legislative stalemates. Mainstream voters belonging to blocs, parties, and coalitions hosted on the network will have ample and effective mechanisms for reconciling divergent legislative priorities, especially for building consensus with voters across partisan lines.

In addition to transmitting their legislative agendas directly to lawmakers, voters will be able to continuously provide direct mandates to lawmakers. They can conduct periodic petition drives, referendums, initiatives, and informal recall votes, using the network's online voting utility. They can publicize the results to alert lawmakers who are unresponsive to voters' priorities and legislative agendas that they might risk defeat in forthcoming elections if they continue to disregard the priorities and agendas of their constituents and voters at large.

In contrast to current election laws that tend to limit voters' influence to specific election districts in which they are eligible to vote, the invention connects voters within and across election districts and national boundaries to build consensus around legislative agendas with multi-district and cross-national scope. They can resolve conflicts, crises and emergencies that cross election district boundaries and require cross-national cooperation, such as climate catastrophes and global pandemics. Members of these blocs, parties, and coalitions can individually register to vote in election districts in which they are eligible to vote, and cast their ballots to elect lawmakers to enact common priorities and agendas.

BRIEF DESCRIPTION OF THE DRAWINGS

The detailed description of the present invention is best understood when read in conjunction with FIG. 1 Schematic Overview and FIG. 2 Methods for Defining Legislative Priorities.

DETAILED DESCRIPTION OF THE INVENTION

Figure 1:
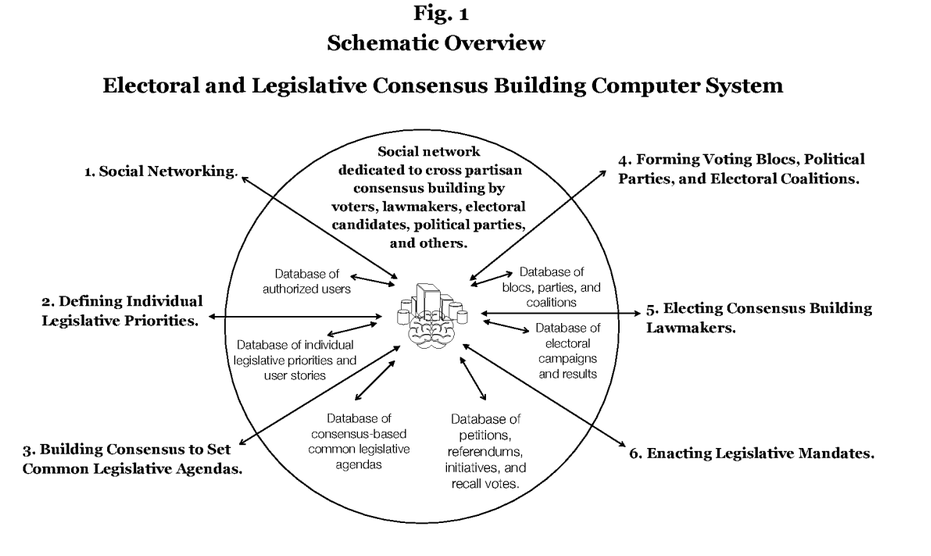
FIG. 1 presents a flow diagram of six steps illustrating how voters, lawmakers, electoral candidates, political parties, and others can become authorized users of the social network; define individual legislative priorities; build consensus to set common legislative agendas; form voting blocs, political parties, and electoral coalitions hosted on the network; plan and implement campaigns to elect consensus building lawmakers of their choice; and conduct petition drives, referendums, initiatives, and informal recall votes to provide mandates to lawmakers to exert their best efforts to enact voters' agendas.

This detailed description is set forth with reference to FIG. 1 Schematic Overview and FIG. 2 Methods for Defining Legislative Priorities.

The disclosed computer-implemented system and methods for electoral and legislative consensus building via a social network facilitate six types of activities related to electoral and legislative consensus building.

Step 1. Social Networking
Step 2. Defining Individual Legislative Priorities
Step 3. Building Consensus to Set Common Legislative Agendas
Step 4. Forming Voting Blocs, Political Parties, and Electoral Coalitions
Step 5. Electing Consensus building Lawmakers
Step 6. Enacting Legislative Mandates The preferred embodiment of the disclosure is the domain of electoral and legislative consensus building in representative forms of government. Users include individuals intending to vote, even if not registered to vote (hereinafter referred to as "voters"), lawmakers, electoral candidates, political parties, and others, such as interest groups, civil social organizations. Their use of the disclosure commences with accessing the network via user devices to request verified encrypted identities from the social network's administrator authorizing users to create personal profiles and utilize the social network's communication and decision-making tools and mechanisms.

The disclosure enables authorized users (hereinafter referred to as "users") to:
Individually define and periodically update their legislative priorities using several methods;
Connect to other users to collaboratively gather, fact-check, evaluate, define, share, and debate their respective priorities;
Build consensus across partisan lines to reconcile divergent views and set common legislative agendas;
Form voting blocs, political parties, and electoral coalitions around common legislative agendas;
Plan and conduct campaigns to elect lawmakers of their choice in forthcoming elections to enact their agendas.

The computer-implemented system and methods provide users access to a corpus of data in the domain of elections and legislation, which includes repositories of laws, legislative proposals, deliberations, and lawmakers' votes; policy and program evaluations; information describing users' agenda setting and consensus building activities; users' intra-network votes; user stories; content from social media, newspapers and journals.

Users can query the system's decision-assisting Artificial Intelligence and machine learning technology to obtain answers comprising a plurality of legislative priorities which they can fact check using the technology. They can evaluate the priorities, and conduct dialogue, debates and votes on priorities to include in common legislative agendas, using the system's voting utility. The massive data processing capabilities of machine learning technology can provide users a broader range of legislative priorities than they might otherwise consider, and facilitate collaborative, in-depth evaluation of a broader range of alternatives by self-selecting aggregates of voters, lawmakers, electoral candidates, political parties, and others who request such information.

The computer-based, fact-checking capabilities provided by machine learning technology enables users to counteract the misinformation often spread by social media. They can use this technology to identify and reject misleading and erroneous information, and consequently set individual and common agendas on the basis of accurate, fact-checked information.

The disclosed social network enables users worldwide to connect to each other to collaborate within and across election district and national boundaries to devise common legislative agendas to solve common problems, crises, and emergencies that necessitate domestic and cross national legislative action.

Currently, voters seeking to actively participate in elections and legislation typically find their spheres of activity largely confined to a single election district in which they are eligible to vote in a single country. In contrast, the social network enables voters to extend their influence beyond single election districts in which they are eligible to vote, and collaborate with other voters in multiple jurisdictions to devise legislative solutions to challenges that span election districts within and across domestic and national boundaries.

The disclosure further enables voters to expand the scope of their collaborative electoral and legislative agenda-setting and related activities across partisan lines, beyond the confines of the partisan priorities endorsed by established political parties. Parties typically do not provide voters effective mechanisms for defining their legislative priorities and agendas in writing, across the board, as does the disclosed social network, and transmitting them to party officials to influence party platforms, agendas, slates of candidates, and candidates' platforms, and legislative priorities and agendas after they are elected. The disclosed social network remedies the current lack of such mechanisms by providing voters an autonomous online platform for defining their legislative priorities across partisan lines, building consensus with other voters around common legislative agendas that cross partisan lines, and transmitting their agendas to parties, electoral candidates, lawmakers, other interests, and the public at large.

To implement their agendas, voters can use the social network to form online voting blocs, political parties, and electoral coalitions hosted on the network, and reach out to voters across partisan lines to build sufficient cross partisan voting strength to nominate and elect lawmakers to enact voters' agendas. In addition, voters can use the network's voting utility to conduct periodic petition drives, referenda, initiatives, and informal recall votes. They can publicize and use the results to provide written mandates to elected representatives directing them to enact voters' agendas.

Step 1. Social Networking

The first step in using the disclosed computer-implemented system and methods for electoral and legislative consensus building via a social network involves prospective users accessing the social network to obtain verified, encrypted identities from the network administrator in order to gain authorization to use the network's communication tools and create user accounts and profiles. Information about these interactions can be processed and stored in the Database of authorized users, as illustrated in FIG. 1.

This encryption requirement is designed to prevent access to the network by individuals, groups, trolls, bots, and foreign entities that disguise their identities, which might seek to disseminate misinformation that misleads, confuses, distorts, or biases voters' perceptions in order to sway their political alignments and electoral and legislative preferences and priorities. (King, Julian. 2018. *"Democracy Is under Threat from the Malicious Use of Technology. The EU Is Fighting Back." The Guardian.* https://www.theguardian.com/commentisfree/2018/jul/28/democracy-threatened-malicious-technology-eu-fighting-back)

Authorized users will be provided account settings they can use to control access to their own intra-network communications and knowledge bases which they create, manage and host on the network. They can initiate and manage their own private online dialogues to evaluate, share, discuss, debate and vote on legislative priorities for inclusion in common legislative agendas.

The disclosure is designed to circumvent current dilemmas associated with Artificial Intelligence (AI) and machine learning technology that have been summarized by Oxford University scientist V. Polonski. He argues that a representative democracy depends on free and fair elections, but elections are being undermined by technology that is deceptively used to manipulate voters' perceptions and promote extremist narratives. Yet he asserts AI technology is not inherently harmful, because the same algorithmic tools that can be used to mislead can also be used to provide fact-checked information, as will occur in the disclosed system. He refers to this use of AI as "human-centered AI". (Polonski, V. 2017. "The Good, the Bad and the Ugly Uses of Machine Learning in Election Campaigns." *Centre for Public Impact (CPI).* https://www.centreforpublicimpact.org/good-bad-ugly-uses-machine-learning-election-campaigns/.)

Step 2. Defining Individual Legislative Priorities

This second step enables authorized users to define their legislative priorities using several methods. Information about these interactions can be stored in the searchable Database of individual legislative priorities and user stories, as illustrated in FIG. 1.

Figure 2:
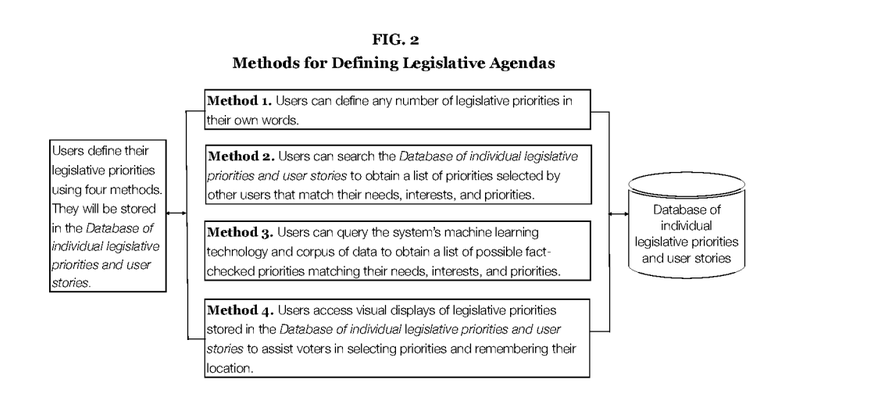
FIG. 2 Methods for Defining Legislative Priorities depicts four methods by which users can define their legislative priorities.

The methods for defining their legislative priorities are depicted in FIG. 2.

Method 1. Users can define any number of legislative priorities, in their own words, and insert them into a drop-down window. Their priorities can be transmitted to the searchable Database of individual legislative priorities and user stories for storage, retrieval, sharing, and comparison.

Method 2. Users enter keywords into a drop-down window describing their needs, interests, and legislative priorities. They can search the Database of individual legislative priorities and user stories to obtain a list of priorities selected by other users that match their needs and interests. They can evaluate the priorities on the list, and then define their own priorities in their own words, which can be added to the database.

Method 3. Users enter keywords into a drop-down window describing their needs, interests and legislative priorities. They can then query the system's machine learning technology and corpus of data to obtain a list of possible priorities matching their needs and interests, including but not limited to the priorities defined by other users and members of existing voting blocs, political parties, and electoral coalitions hosted on the website. Users can evaluate these priorities, and then define their priorities in their own words, which can be added to the database.

Method 4. Users access visual displays of legislative priorities stored in the Database of individual legislative priorities and user stories, including image metaphors such as decks of playing cards in which priorities are grouped by theme under each suit to assist voters in selecting priorities and recalling their location.

3. Building Consensus to Set Common Legislative Agendas

Recent setbacks in the functioning of democracies worldwide have been researched and reported by *The Economist Intelligence Unit.* ("Economist Intelligence Unit (EIU) Democracy Index 2019—World Democracy Report." http://www.eiu.com/topic/democracy-index.) These setbacks occur in multiple aspects of governance functions, including electoral processes. Academic research has identified numerous Impediments to voters' exercise of their popular sovereignty which the disclosed network will address.

These include the lack of mechanisms through which voters can define their legislative priorities across the board in writing, update them at will, collectively reconcile divergent priorities, and transmit their legislative priorities and common legislative agendas to political parties, electoral candidates, and elected lawmakers to guide and direct their legislative actions and decisions.

Lacking this mechanism, contemporary voters, including U.S. voters, play relatively passive roles with respect to determining the legislative priorities that electoral candidates espouse and elected lawmakers enact into law. Voters are typically unable to directly nominate their own candidates to run on electoral ballot lines. Instead they are constrained to choosing among party candidates who are already on the ballot, who have set their own legislative agendas with little, if any, input from voters, and who will be authorized after election to enact laws in legislative bodies over which voters exert little influence or recourse.

In contrast, the disclosed system enables voters to increase their influence over electoral and legislative processes, especially the determination of who runs for office, who gets elected, and what laws are passed. (Hill, Steven. 2002. "Fixing Elections: The Failure of America's Winner Take All Politics." *Routledge & CRC Press.* https://www.routledge.com/Fixing-Elections-The-Failure-of-Americas-Winner-Take-All-Politics/Hill/p/book/9780415931946.)

The disclosed social network connects voters to a single, autonomous, web-based platform that provides them tools for collaboratively building consensus online across partisan lines. They can use these tools to devise common legislative agendas through dialogue and collective decision-making by conducting online votes with voters across the partisan spectrum, using the system's voting utility. Information about these interactions can be stored in the searchable Database of consensus-based common legislative agendas, as illustrated in FIG. 1.

Step 4. Forming Voting Blocs, Political Parties, and Electoral Coalitions.

Users of the disclosed system, methods, and social network can implement their legislative priorities and agendas by building their own voting blocs, political parties, and electoral coalitions hosted on the network, whose members autonomously define their own legislative priorities, and collectively manage their blocs, parties, and coalitions according to rules their members collectively determine. Each member will be able to cast votes on items members request be put to a vote, using the system's voting utility. If voters are dissatisfied with the actions of a bloc, party, or coalition of which they are a member, they can endeavor to change them by conducting voters on their own proposals. If these efforts are unsatisfactory, they can exit and start or join other blocs, parties, and coalitions hosted on the network. Information about these interactions can be stored in a searchable Database of blocs, parties, and coalitions.

Analyst Clay Shirky describes the unique role that social network-based self-selecting aggregates of people can exercise by providing voluntary access to new members, known as "crowdsourcing".

He states that the action of such "crowdsourced" groups "adds up to something more than just aggregated individual action." An example is the autonomous crowdsourcing of individuals to participate in collective electoral and legislative consensus building that the disclosed system will facilitate. It can lead to what Shirky terms "collective action" stemming from their members' recognition that the "fate of the group as a whole becomes important". (Shirky, Clay. 2009. *Here Comes Everybody: The Power of Organizing without Organizations: [With an Updated Epilogue]*. New York, NY Toronto London: Penguin Books. "Clay Shirky." *Wikipedia*. (https://en.wikipedia.org/w/index.php?title=Clay_Shirky&oldid=969194372.)

The disclosure's "crowdsourcing" capabilities of its social network enables users to address life-threatening crises and emergencies, such as those posed by climate disruption and global pandemics. It can bring into electoral and legislative decision-making far larger numbers of self-selecting aggregates of users than previously, including voters, lawmakers, electoral candidates, political parties, and other interests, and infuse in electoral and legislative processes the knowledge and expertise they possess.

Related research into "crowdsourcing government" initiatives being undertaken in a growing number of countries indicates that aggregates of self-selecting voters, working together collaboratively, tend to make more rational, workable, and popularly responsive decisions than smaller numbers of lawmakers—especially those working in isolation from their constituents. (Liu, Helen K. 2017. "Crowdsourcing Government: Lessons from Multiple Disciplines." *Public Administration Review* 77(5): 656-67. https://onlinelibrary.wiley.com/doi/abs/10.1111/puar.12808)

Technology-based initiatives, such as the disclosed system, enable voters to take advantage of advanced computer-based technologies, as exemplified by IBM's AI-based Watson technology. This machine learning technology comprises an effective "question-answering computer system capable of answering questions posed in natural language. "It increases the question-answering capabilities of computer-based processes and techniques as the system receives more questions. (IBM Watson Computer. 2020. "Watson (Computer)." *Wikipedia*. https://en.wikipedia.org/wiki/Watson_(computer).

By using machine learning technology, such computer systems can improve the accuracy and relevance of their responses to successive rounds of questions. By incorporating questions and responses from previous inquiries into their algorithms and corpuses of data, they are able to provide more useful answer to future inquiries.

With respect to the disclosed social network, individual users and members of voting blocs, political parties, and electoral coalitions hosted on the network will be able to use similar machine learning technology to query the system's corpus of data in the domain of elections and legislation to obtain increasingly accurate and relevant information. This includes information contained in existing repositories of laws, legislative proposals, deliberations, and lawmakers' votes; policy and program evaluations; information describing users' agenda setting and consensus building activities; users' intra-network votes; user stories; content from social media, newspapers and journals.

Users of the disclosed network's AI-based decision support to utilize this technology, individually and collectively, to assist them in defining their legislative priorities, and formulating their own legislative solutions and agendas for surmounting the challenges and problems confronting them requiring legislative action.

Step 5. Electing Consensus Building Lawmakers

Voters' voting blocs, parties, and coalitions hosted on the network can use network mechanisms to plan and conduct online campaigns to elect consensus building lawmakers of their choice, whom voters mandate to enact users' legislative agendas. Information about these interactions can be stored in the searchable Database of electoral campaigns and results.

Currently, small numbers of elected representatives, ranging in the U.S. from a few hundred to a few thousand, make legislative decisions and enact laws governing millions of people. Often they represent a minority of voters and the popular at large, even though they enact laws governing the population as a whole.

The effectiveness of laws they enact can be compromised by ongoing partisan conflicts among lawmakers. Their effectiveness can also be compromised by disjointed, piecemeal, ill-coordinated, and superficially researched legislation that fails to heed lessons learned from evaluations of the consequences of previously enacted policies and programs.

Lawmakers' legislative priorities and decision-making typically does not reflect in-depth consultation with a broad range of lawmakers' constituents. This consultative failure is due in large part to the lack of large scale mechanisms for agenda setting through which voters can define and update their legislative priorities in their own words, across the board, without regard to party priorities, platforms, and partisan principles and practices. The result is that voters and lawmakers tend to hold divergent legislative priorities, which often prove irreconcilable due to the lack of the consensus building mechanisms that will be provided by the disclosed system.

Step 6. Enacting Legislative Mandates

After elections are held and winning candidates take office, voters can use the disclosed system's online voting utility to conduct online petition drives, referendums, initiatives, and informal recall votes to provide lawmakers periodically updated legislative mandates. They can publicize the results to alert lawmakers who are unresponsive to voters' priorities and legislative agendas that they might risk defeat in forthcoming elections if they continue to disregard the priorities and agendas of their constituents and voters at large.

If they do not heed voters' requests, the members of users' voting blocs, political parties, and electoral coalitions hosted on the disclosed social network can plan and implement electoral campaigns. They can use their campaigns to elect candidates of their choice to legislative bodies in multiple election districts and nations of their choice, which have representative forms of government entitling their citizens to vote for lawmakers to represent them in legislative and executive decision-making bodies and offices. The members of these blocs, parties, and coalitions can use the results of their own internal intra-network votes, in conjunction with analyses of their representatives' legislative actions and track records, to decide whether to support them in upcoming elections, or vote to replace them with electoral candidates of their choice.

Information describing these activities can be stored in the searchable Database of petitions, referendums, initiatives, and informal recall votes.

What is claimed is:

1. A computer-implemented system for electoral and legislative consensus building within a web-based political consensus-building social network on the Internet, comprising:

a server configured for processing, managing, retrieving, updating, and storing data of elections and legislation to offset and replace traditional, technologically obsolete dissensus-producing political processes with computer-based, electronic political consensus-building;

said web-based political consensus-building social network on the Internet configured for providing access to a plurality of computer-based user devices operated by user/voters and self-selecting groups of the user/voters;

searchable databases comprised of written legislative priorities from which each user/voter can select their own legislative priorities;

a computer-based user interface/user experience (UX/UI) for providing the user/voters access to the web-based political consensus-building social network on the Internet;

a computer-based graphical user interface to the said web-based political consensus-building social network on the Internet to assist user/voters learn how to use the political consensus-building Artificial Intelligence and Machine Learning technology of said web-based political consensus-building social network on the Internet to build consensus online to define legislative priorities;

digital tools to assist the user/voters of said web-based political consensus-building social network on the Internet learn how to use electronic methods to define, share, and debate their legislative priorities with each other and set common legislative agendas;

a searchable corpus of data of elections and legislation, the searchable corpus of data comprising repositories of laws, legislative proposals, deliberations, lawmakers' votes, policy evaluations, and information describing the user/voters choices of legislative priorities, legislative agendas and consensus building activities, user/voters consensus-building stories, and political consensus-building content from social media, newspapers and journals;

an online voting utility that self-selecting groups of user/voters can access via the said web-based political consensus-building social network on the Internet in order to vote on legislative priorities to include in common legislative agendas;

decision-assisting Artificial Intelligence and question-answering Machine Learning technology configured to provide decision support to user/voters to assist user/voters in defining user/voter legislative priorities, by posing queries to the Machine Learning technology in natural language to obtain answers containing a plurality of legislative priorities with information for user/voters fact-checking, evaluating, debating, and selecting by voting when defining legislative priorities and setting common legislative agendas; and online consensus-building voting blocs, political parties, and electoral coalitions hosted on the web-based political consensus-building social network on the Internet formed by user/voters with common agendas, wherein said web-based political consensus-building social network on the Internet is further configured to allow user/voters to:

select legislative priorities using three methods, the three methods comprising:

a first method for individual user/voters legislative agenda-setting, wherein an authorized user/voter can define any number of legislative priorities in their own words and add their priorities to a searchable Database of individual user/voters legislative priorities and user stories for storing, retrieving, updating, sharing, comparing and contrasting with other authorized user/voters priorities;

a second method for individual user/voters legislative agenda setting wherein authorized user/voters can enter keywords into a drop-down window describing their interests, and legislative priorities; search the said Database of individual user/voters legislative priorities and user/voters stories to obtain a list of priorities selected by other user/voters that match their interests, and priorities; evaluate priorities; define their own priorities in their own words; and add their priorities to the said Database of individual user/voters legislative priorities and user/voters stories for storing, retrieving, updating, sharing, comparing and contrasting with other authorized user/voters priorities;

a third method for individual user/voters legislative agenda-setting, wherein authorized user/voters can enter keywords into a drop-down window describing their interests, and legislative priorities; query the system's Machine Learning technology and searchable corpus of data to obtain fact-checked lists of legislative priorities matching user/voters interests, and priorities, including but not limited to priorities specified by other user/voters users and members of existing said online consensus-building voting blocs, political parties and electoral coalitions hosted on the website; evaluate and compare priorities; define their priorities in their own words, and add their priorities in the said Database of individual user/voters legislative priorities and user stories for storing, retrieving, updating, sharing, comparing and contrasting with other authorized user/voters priorities.

2. The computer-implemented system of claim 1, wherein said web-based political consensus-building social network on the Internet is accessible by prospective user/voters to obtain verified, encrypted identities and gain authorization to create individual accounts, profiles, internal email addresses and web pages; interact with other authorized user/voters; access the said web-based social network's said online voting utility to vote on proposals initiated by other authorized user/voters, generating information that is added to a searchable Database of authorized users.

3. The computer-implemented system of claim 1 wherein said web-based political consensus-building social network on the Internet is further configured to allow user/voters to:

create a computer-based ranking mechanism enabling authorized user/voters to rank order the legislative priorities they define;

enable authorized user/voters to add their ranked priorities to the said Database of individual user/voters legislative priorities and user/voters stories for storing, retrieving, sharing, updating, comparing, and contrasting with other authorized user/voters priorities.

4. The computer-implemented system of claim 1, wherein said web-based political consensus-building social network on the Internet is further configured to allow user/voters to:
enable self-selecting groups of authorized user/voters to collaboratively define their legislative priorities and build consensus in support of shared legislative priorities and agendas by querying the system's Machine Learning technology to obtain in response a plurality of possible legislative priorities;
enable groups of user/voters to collaboratively fact-check and evaluate legislative priorities, and conduct dialogues, debates, and votes to collectively decide which priorities to include in common legislative agendas, using the system's said online voting utility;
generate information that can be added to a searchable Database of consensus-based common legislative agendas for storing, retrieving, updating, sharing, comparing, and contrasting the common legislative agendas of the said online political consensus-building voting blocs, political parties, and electoral coalitions.

5. The computer-implemented system of claim 1, wherein said web-based political consensus-building social network on the Internet is further configured to allow user/voters to:
enable groups of authorized user/voters with similar legislative priorities and legislative agendas to access the said web-based political consensus-building social network on the Internet's agenda setting mechanisms to form and manage online voting blocs, political parties, and electoral coalitions hosted on the network;
enable user/voters voting blocs, political parties, and electoral coalitions to build political consensus domestically and cross-nationally within said blocs, parties, and coalitions to collaboratively set common legislative agendas and adopt slates of electoral candidates;
enable user/voters blocs, parties, and coalitions to recruit voters across partisan lines to join their blocs, parties, and coalitions to obtain the voting strength needed to elect candidates of their choice;
generate information that can be added to a searchable Database of blocs, parties, and coalitions for storing, retrieving, updating, sharing, comparing, and contrasting information about bloc, party, and coalition collaborative agenda-setting and consensus-building.

6. The computer-implemented system of claim 1, wherein said web-based political consensus-building social network on the Internet is further configured to allow user/voters to:
enable groups of authorized user/voters and their voting blocs, political parties, and electoral coalitions hosted on the said web-based political consensus-building social network on the Internet to plan and conduct online and offline campaigns to endorse candidates and elect representatives and lawmakers of their choice in one or more election districts within and across nation-state boundaries in which sub-groups of their members may be eligible to vote and can register to vote;
generate information that can be added to a searchable Database of electoral campaigns and results for storing, retrieving, updating, sharing, comparing, and contrasting information about campaigns and results.

7. The computer-implemented system of claim 1, wherein said web-based political consensus-building social network on the Internet is further configured to allow user/voters to:
enable user/voters and their said voting blocs, political parties, and electoral coalitions hosted on the said web-based political consensus-building social network on the Internet to conduct and vote in online petition drives, referendums, initiatives, and informal recall votes, using the said online voting utility;
publicize the results of the said online petition drives, referendums, initiatives, and informal recall votes and transmitting them as legislative mandates directing elected representatives to enact voters' legislative agendas;
generate information that can be added to a searchable Database of petitions, referendums, initiatives, and informal recall votes for storing, retrieving, sharing, and periodically updating information about these actions.

8. The computer-implemented system of claim 1, wherein said web-based political consensus-building social network on the Internet is further configured to allow user/voters to:
enable authorized user/voters and their said voting blocs, political parties, and electoral coalitions hosted on the said web-based political consensus-building social network on the Internet to utilize the system's Machine Learning technology to mine the searchable corpus of data, to gather, share and evaluate information pertaining to legislative actions taken by incumbent lawmakers;
provide authorized user/voters access to the said web-based political consensus-building social network on the Internet's voting utility to collectively decide by voting on whether their said voting blocs, political parties, and electoral coalitions intend to campaign for the re-election of incumbent lawmakers in future elections, or endorse and vote for alternative electoral candidates to replace incumbents with lawmakers mandated to enact voters' legislative agendas.

9. The computer-implemented system of claim 1, wherein said web-based political consensus-building social network on the Internet is further configured to:
enable the searchable corpus of data and databases to be mined to compose stories describing user/voters activities and interactions to define their legislative priorities and build political consensus to set common legislative agendas; form said online voting blocs, political parties, and electoral coalitions around common legislative agendas; plan and conduct campaigns to elect lawmakers of their choice to enact user/voters legislative agendas.

10. The computer-implemented system of claim 1, wherein said web-based political consensus-building social network on the Internet is further configured to allow user/voters to:
create digital media, auditory, visual, and textual metaphors to display on users' devices legislative priorities contained in the searchable corpus of data.

* * * * *